United States Patent [19]
Watanabe et al.

[11] Patent Number: 5,624,696
[45] Date of Patent: Apr. 29, 1997

[54] APPARATUS FOR INTERMITTENTLY EXTRUDING A PREDETERMINED QUANTITY OF FOOD MATERIAL

[75] Inventors: Yukio Watanabe; Michio Morikawa, both of Utsunomiya, Japan

[73] Assignee: Rheon Automatic Machinery Co. Ltd., Utsunomiya, Japan

[21] Appl. No.: 541,753

[22] Filed: Oct. 10, 1995

[30] Foreign Application Priority Data

Oct. 13, 1994 [JP] Japan .................................. 6-275817

[51] Int. Cl.$^6$ .............................. B29C 47/00; G05D 16/00
[52] U.S. Cl. ........................... 426/231; 425/149; 425/170; 426/516
[58] Field of Search .................................. 426/231, 516; 425/149, 170

[56] References Cited

U.S. PATENT DOCUMENTS

| 4,338,341 | 7/1982 | Glass | 425/149 |
| 5,165,949 | 11/1992 | Farnsworth et al. | 426/516 |

*Primary Examiner*—George Yeung
*Attorney, Agent, or Firm*—Guy W. Shoup; Patrick T. Bever

[57] ABSTRACT

An extruding apparatus for intermittently supplying a predetermined quantity of highly viscoelastic fluid material, e.g. food material. The apparatus has a supply pump, one end of which is connected to a hopper containing the food material and the other end connected to an extrusion valve covered with a housing via a supply pipe and a pressure sensing means mounted in the housing or in the supply pipe, thereby always sensing the pressure of the food material in the valve to keep the pressure to a predetermined value by operating or stopping the supply pump.

10 Claims, 5 Drawing Sheets

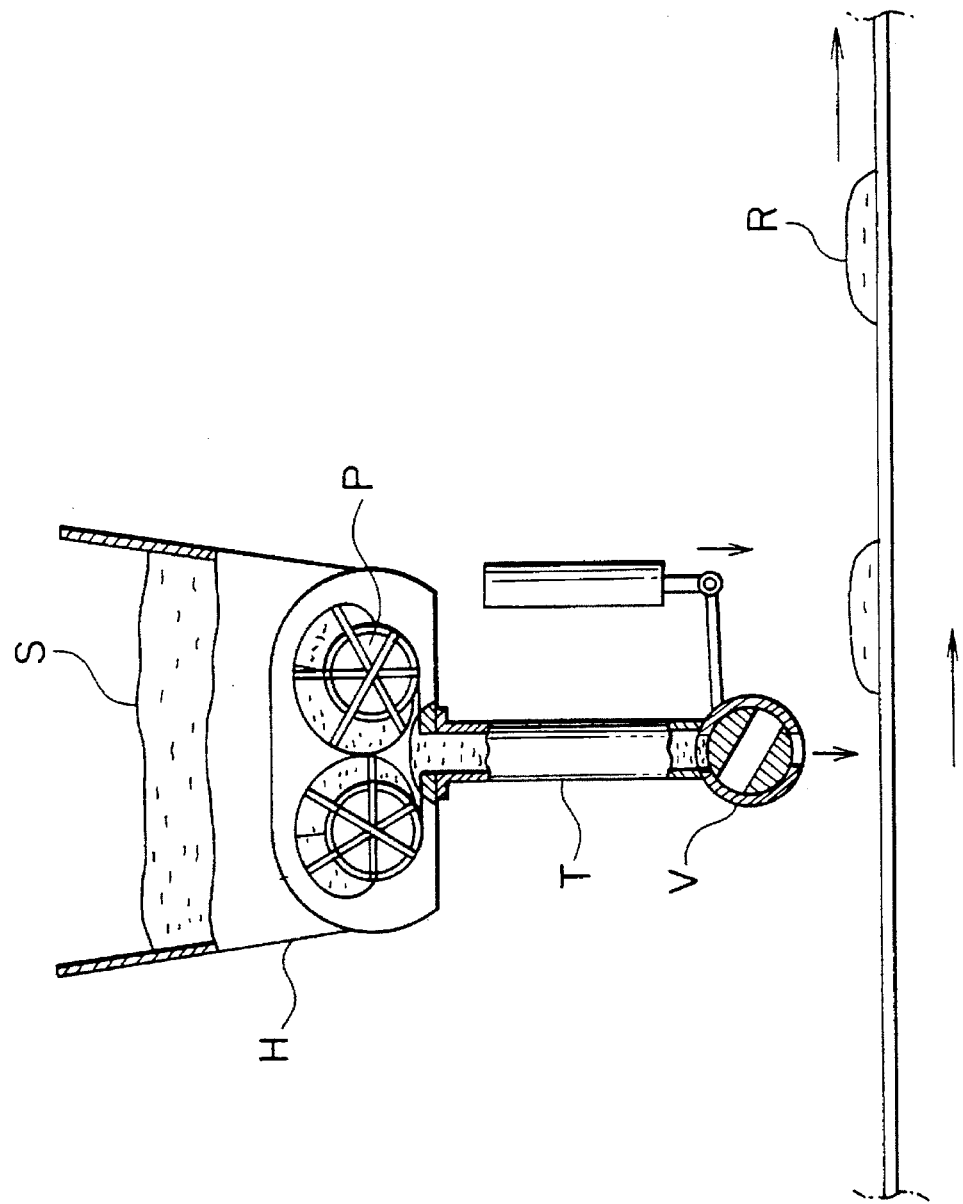

APPARATUS FOR INTERMITTENTLY EXTRUDING A PREDETERMINED QUANTITY OF FOOD MATERIAL

DETAILED DESCRIPTION OF THE INVENTION

1. Industrial Field of the Invention

The present invention relates to an apparatus for intermittently extruding a predetermined quantity of highly viscoelastic fluid material, e.g. food material, to supply a predetermined amount of the material.

2. Prior Art

A prior-art technique as shown in FIG. 7 relating to the present invention uses an apparatus for intermittently supplying food material S. The apparatus has a supply pump P and an extrusion valve V, the supply pump P being adapted to supply the food material S contained in a hopper H.

When the food material S is supplied by this apparatus, the material is supplied to a supply pipe T while the extrusion valve V is closed and the supply pump P is stopped. When the extrusion valve V opens, the supply pump P simultaneously begins to rotate to supply under a predetermined pressure the food material S into the supply pipe T. Thus, a predetermined amount of the food material S is intermittently discharged through the exit of the extrusion valve V.

Namely, the food material S is caused to be extruded when the supply pump P begins to rotate and at the same time the extrusion valve V opens. After a predetermined time the supply pump P stops rotating, and simultaneously the extrusion valve V closes, thereby a predetermined quantity of the material is discharged.

In this case, if the intervals of the opening and closing of the extrusion valve V are not equal, the food material S supplied to the supply pipe T will flow back to the hopper H through the supply pump P. This brings about a density change in the food material S, and also renders unstable the pressure of the food material S in the supply pipe T. Therefore, this poses a problem in that the following food material S cannot be extruded in a predetermined amount.

SUMMARY

A goal of the present invention is to overcome the above-described disadvantage of the prior art. Namely, in the prior art technique of intermittently supplying a predetermined quantity of highly viscoelastic food material, for instance, topping material consisting of a highly viscoelastic biscuit used for producing cake bread like melon bread, etc., or topping material mixed with chocolate chips or raisins, chocolates, jams, custards, etc., or highly viscoelastic food material such as kneaded sea urchins and cheese, the food material is extruded from the exit at unequal intervals and it flows back when the pump is stopped when the food material is extruded. The pressure in the food material decreases as it is extruded from the extrusion valve and so does the pressure at the lower end of the supply pump.

In accordance with the present invention, an apparatus intermittently supplies a predetermined quantity of food material wherein, by adjusting the extrusion pressure in the extrusion valve, which pressure is kept constant, the extrusion of a predetermined quantity of food material is stably maintained.

A second goal is to intermittently supply a predetermined quantity of food material using an apparatus that can stably supply a predetermined quantity of e.g. topping material over dough bodies that are carried on a conveyor at preset or unequal intervals.

In accordance with the present invention, an apparatus for intermittently extruding a predetermined quantity of food material includes a hopper with a supply pump at its exit, a supply pipe having one end connected to the pump and the other end to an extrusion valve covered with a housing, and a pressure sensing means mounted on the housing or the supply pipe near the housing.

Further, in accordance with the present invention an apparatus for intermittently extruding a predetermined quantity of food material includes a hopper, a position sensing means located above a conveying means, a supply pump provided at the exit of the hopper at a position above the conveying means and downstream of the position sensing means, a supply pipe having one end connected to the supply pump and the other end to an extrusion valve covered with a housing, and a pressure sensing means mounted on the housing or the supply pipe near the housing.

BRIEF DESCRIPTION OF THE DRAWINGS

FIG. 7 is a partial cross-sectional front view of a prior art apparatus.

DETAILED DESCRIPTION

Figure 1:
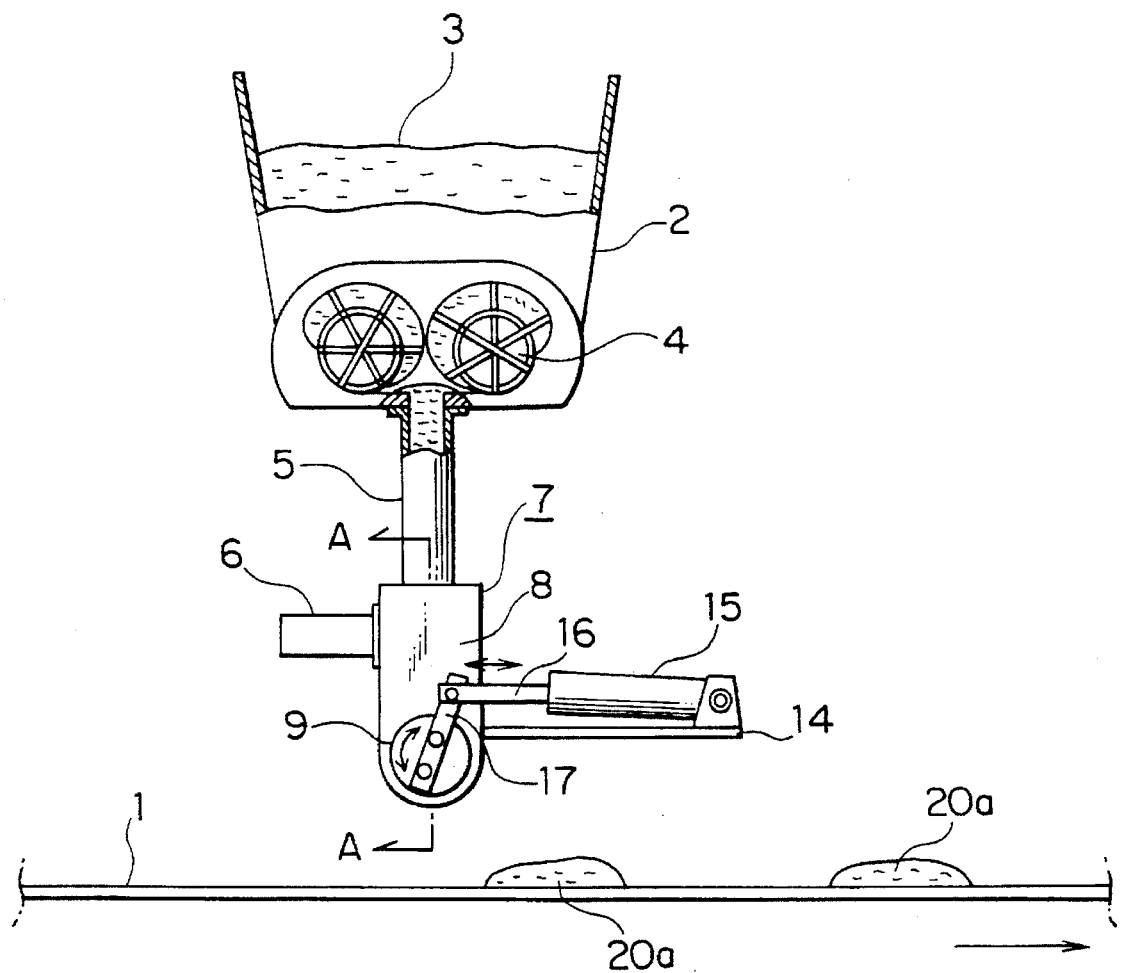
FIG. 1 is a partly cut away front view showing a first embodiment in accordance with the present invention.
Figure 2:
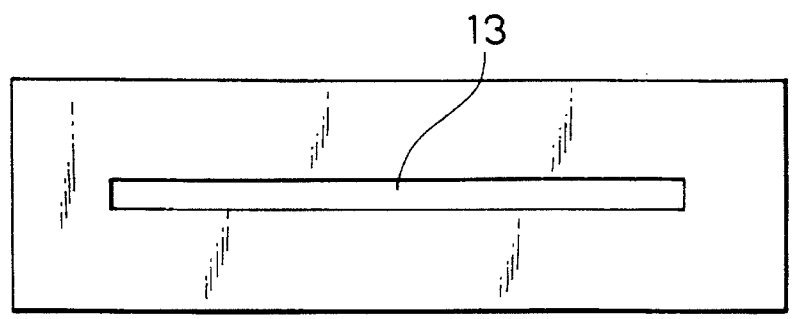
FIG. 2 is a partial bottom view of the extrusion valve of FIG. 1.
Figure 3:
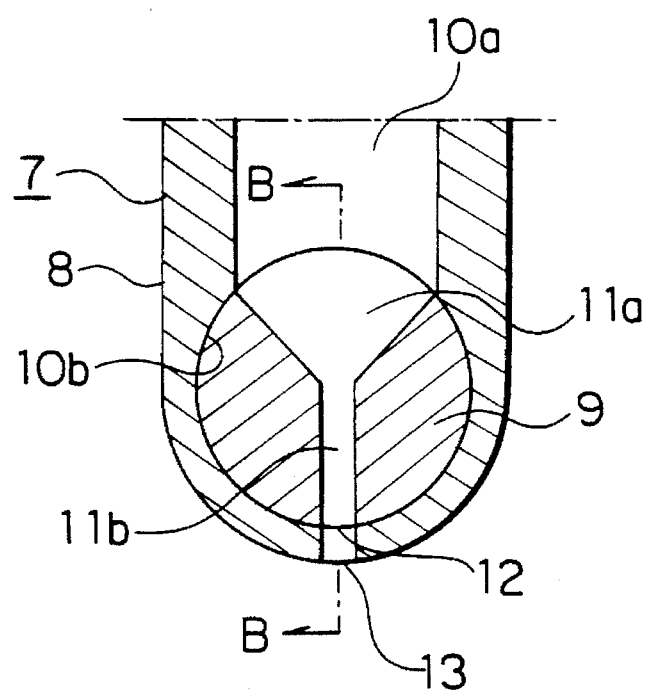
FIG. 3 is a partly cut away cross-sectional view taken along line A—A of FIG. 1.
Figure 4:
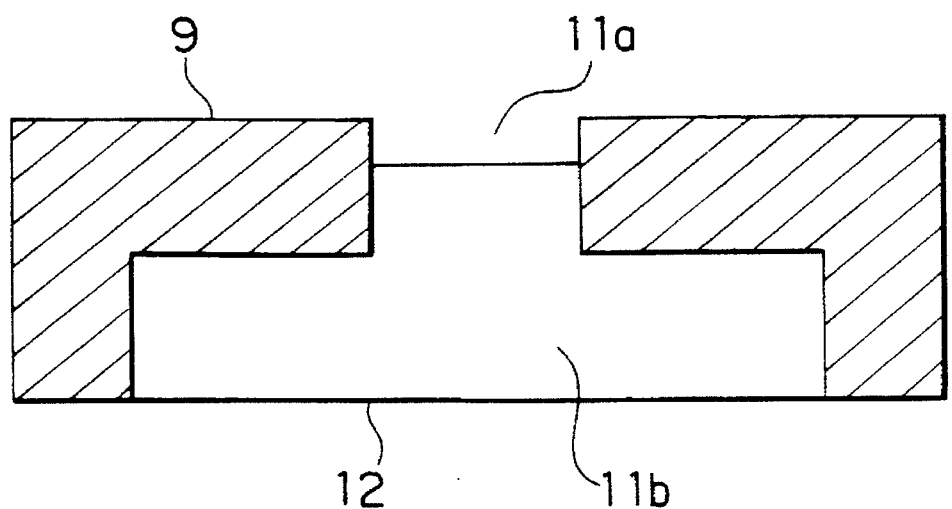
FIG. 4 is a cross-sectional view taken along line B—B of FIG. 3.
Figure 5:
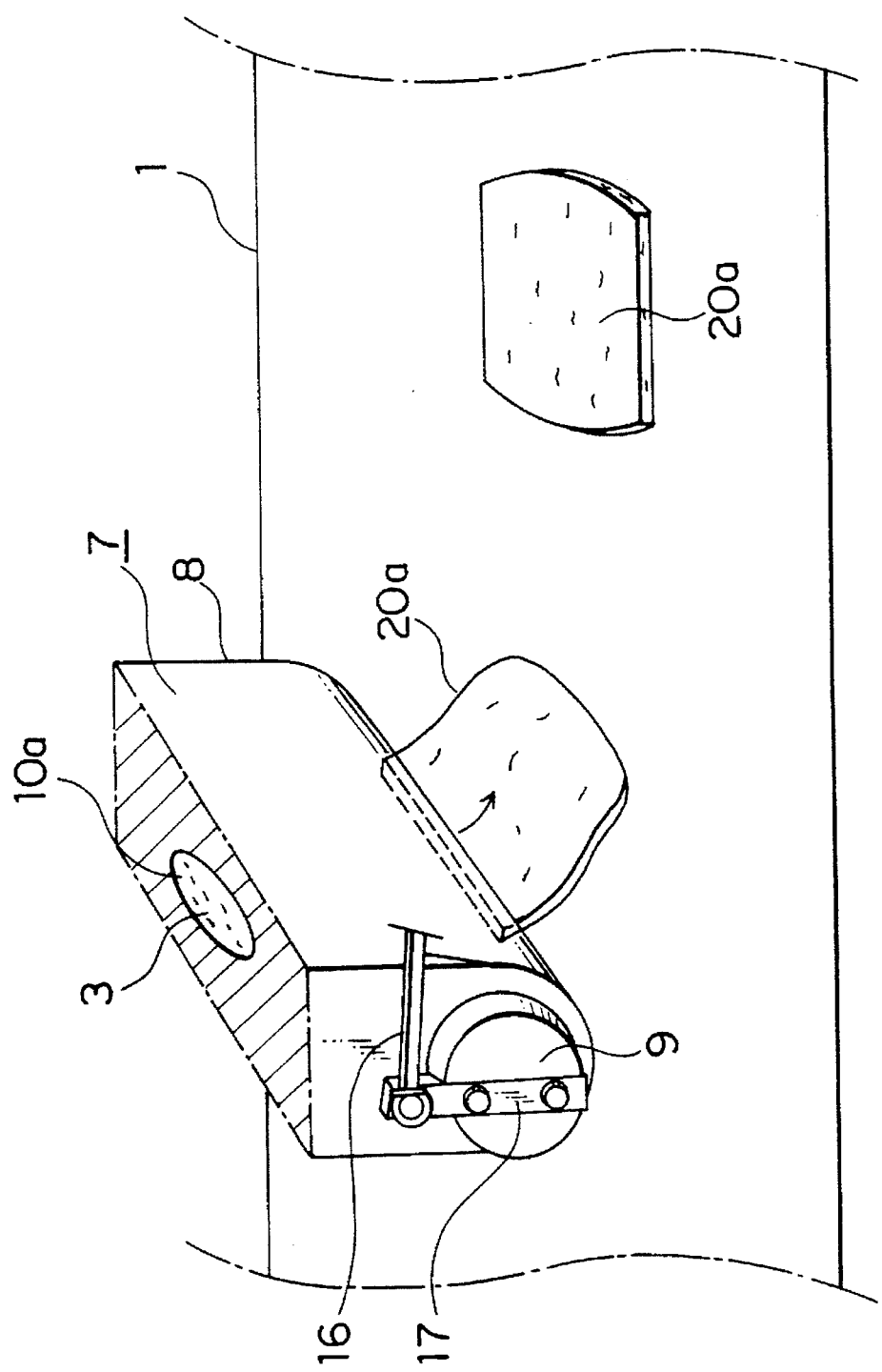
FIG. 5 is a partly cut away explanatory view of the extrusion valve of FIG. 1.
Figure 6:
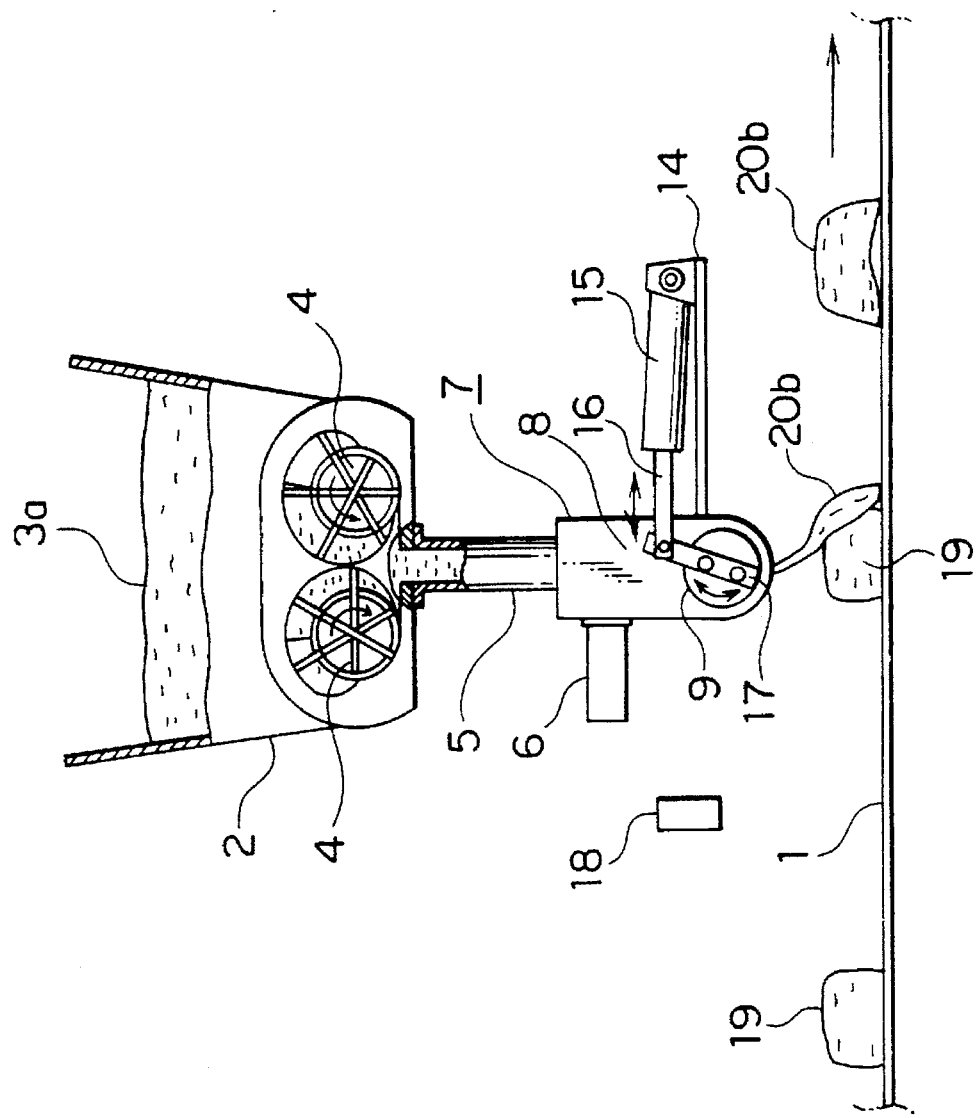
FIG. 6 is a partial cross-sectional front view showing a second embodiment in accordance with the present invention.

To realize the above-mentioned first goal, as shown in both FIGS. 1 and 6 in accordance with the present invention a supply pump 4 is provided at the exit of a hopper 2, and one end of a supply pipe 5 is connected to the pump 4 and the other end to an extrusion valve 7 covered by a housing 8. A pressure sensor 6 that measures the pressure in the supply pipe 5 and generates resulting pressure measurement signals is mounted e.g. in the housing 8 or in the supply pipe 5 near the housing 8. By this arrangement, when the pressure of the food material in the extrusion valve 7 falls below a predetermined value, the supply pump 4 is operated to extrude the food material to keeping the pressure of the material in the valve 7 at the predetermined value. Thereafter the pump 4 stops. Extruded dough pieces 20a are intermittently supplied to the conveyor 1.

To attain the above-mentioned second goal, an apparatus has the structure shown in FIG. 6. A position sensor 18 is located above a conveyor 1 that moves intermittently or at a fixed speed and a supply pump 4 is provided at the exit of the hopper 2 downstream (relative to the conveyor 1) of the position sensor 18 and above the conveyor 1. A supply pipe 5 is provided, one end of which is connected to the supply pump 4 and the other end to an extrusion valve 7 covered by housing 8. A pressure sensor 6 communicating with the interior of pipe 5 is mounted e.g. on the housing 8 or the supply pipe 5 near the housing 8. By this arrangement when the pressure of the topping material flowing into the extrusion valve 7 is lower than a predetermined value, the pump 4 is operated to extrude the food material to keep the pressure of the topping material flowing into the extrusion valve 7 at the predetermined value. Thereafter the supply pump 4 stops. The extrusion valve 7 opens and closes based on the sensing signal from the position sensor 18. Thus, the topping material can be stably discharged over the dough bodies 19, consisting e.g. of bread dough pieces, that are supplied at equal or unequal intervals.

First Embodiment

FIGS. 1–5 illustrates a first embodiment of the present apparatus. The conveying means can be a conveyor 1 that moves at a preset speed or intermittently. A supply pump 4 is provided in the hopper 2. The supply pump 4 pushes the food material 3 downward to supply it. The upper end of the supply pipe 5 is connected to the exit of the pump 4. The pump 4 is e.g. a volume-type vane pump.

The food material 3 is e.g. viscoelastic biscuit dough or the same mixed with chocolate chips or raisins.

A pressure sensor 6 is mounted e.g. on the housing inlet 10a of the housing 8 of the extrusion valve 7 or at a position near the exit located at the lower end of the supply pipe 5. The pressure sensor 6 senses the pressure (or change of pressure) in the food material 3 in the pump 5.

A semiconductor-type pressure sensor may be used for the pressure sensor 6 so that it can sense subtle pressure changes. The pressure sensor 6 adjusts (increases) the operating speed of the supply pump 4 via a control feedback loop (not shown) when the sensed pressure decreases.

The pressure fall in the food material 3 in the housing 8 or near the exit of the pipe 5 arises due to:

First, the change of the volume of the food material 3 in the supply pipe 5 when the material is extruded from the extrusion valve 7.

Second, when the extrusion valve 7 is closed and the supply pump 4 is stopped, the strong viscoelastic characteristics of the food material 3 make it flow back into the hopper 2 through the supply pump 4.

For these reasons, when the pressure in the housing 8 or near the exit of the supply pipe 5 becomes lower than the predetermined value, the pressure is increased by operating the supply pump 4 to extrude the food material 3. When the pressure reaches the predetermined value, the supply pump 4 stops (or operates more slowly); thereby the pressure in the housing 8 or near the exit of the supply pipe 5 is kept constant.

The extrusion valve 7 has a housing inlet 10a, a rotor mounting portion 10b, and a long extrusion aperture 13, the upper end of the inlet 10a being connected to the lower end of the supply pipe 5. A rotor 9 is inserted into the rotor mounting portion 10b of the housing 8 so that the rotor can rotate reciprocatively. The rotor 9 is formed with an inlet 11a, a long groove 11b, and a long extrusion aperture 12. When the rotor 9 reciprocates at the rotor mounting portion 10b of the housing 8, the long extrusion aperture 12 located at the end of the long groove 11b and the long extrusion aperture 13 of the housing are made to intermittently conform to each other. The long extrusion aperture 13 of the housing 8 provided in the extrusion valve 7 and the long extrusion aperture 12 of the rotor are apertures having the same lateral dimensions, and the inner diameter of the housing inlet 10a to receive the food material 3 located at the supply pipe 5 side is generally the same as that of the supply pipe 5.

An air cylinder 15 is pivotally supported on a base 14 fixed to the housing 8, and the movable end of the rod 16 of the air cylinder 15 is pivotally connected to the end of an arm 17 connected to the rotor 9. Therefore, when the rod 16 of the air cylinder 15 reciprocates, the rotor 9 in the extrusion valve 7 is rotated. In FIG. 1, intermittently extruded dough pieces 20a are deposited onto the conveyor 1 from the long extrusion aperture 13 of the extrusion valve 7.

The food material 3 in the hopper 2 is supplied by the supply pump 4 to the housing inlet 10a of the supply valve 7 through the supply pipe 5. The food material 3 is filled up to the long extrusion aperture 12 through the rotor inlet 11a and the long groove 11b of the rotor 9.

To realize precise pressure sensing, the pressure sensor 6 is mounted on the housing 8 or the lower end of the supply pipe 5 near the housing 8.

When, for instance, the pressure in the housing 8 becomes lower than the predetermined value as mentioned above, the pressure sensor 6 senses the pressure fall and the resulting signal is transmitted via the feedback control loop (not shown) to the supply pump 4, so that the pump 4 begins to operate (or operates faster). Therefore, the pressure in the housing 8 increases to the predetermined value as the food material 3 is supplied into the supplied pipe 5. When the pressure returns to its predetermined value, the supply pump 4 stops (or slows down), to keep the pressure in the housing 8 almost always constant.

By adjusting the reciprocating movement of the rod's stroke, the amount of rotation of the rotor 9 can be changed. Namely, by adjusting the overlapping relation of the rotor's long extrusion aperture 12 and the housing's long extrusion aperture 13, both apertures having the same lateral dimensions, the space in the direction of the thickness of the food material 3 can be adjusted. Thus, the thickness of the food material 3 when it is extruded from the extrusion valve 7 can be adjusted.

Second Embodiment

In FIG. 6 a position sensor 18, e.g. a photoelectric sensor, is located upstream of the extrusion valve 7 relative to conveyor 1 and above the conveyor 1 that advances at a preset speed in the direction of the arrow. The extrusion valve 7 for extruding e.g. topping food material 3a is provided downstream of the position sensor 18 and above the dough body 19.

The hopper 2 is provided with a supply pump 4 to discharge the topping material 3a. A supply pipe 5 is connected to the supply pump 4. The supply pump 5 can be, for instance, a volume-type vane pump.

The topping material 3a is e.g. biscuit dough pieces or the same mixed with chocolate chips or raisins or jam, etc.

The dough bodies 19 are made of e.g. highly viscoelastic and fermentable bread dough, compressed fish cakes, or boiled fish paste. The dough bodies are intermittently deposited on the conveyor 1 and conveyed successively by it with a certain distance between them.

To sense and measure the pressure change in the topping material 3a, a pressure sensor 6 is mounted e.g. on the housing 8 located at a position near the exit of the supply pipe 5 and in communication with the interior of pipe 5. For the pressure sensor 6 a semiconductor-type pressure sensor, for example, is used so that it can sense a subtle pressure change. The speed of the supply pump 4 is adjusted as the pressure becomes low.

The pressure fall in the housing 8 or near the exit of the pipe 5 is due to:

First, the change of the volume of the topping material 3a in the supply pipe 5 when the material 3a is extruded from the extrusion valve 7.

Second, when the extrusion valve 7 is closed and the supply pump 4 is stopped, the strong viscoelastic characteristics of the topping material 3a make it flow back into the hopper 2 through the supply pump 4.

For these reasons, when the pressure in the housing 8 becomes lower than the predetermined value, for instance, the pressure is increased by operating the supply pump 4 to extrude the topping material 3a. When the pressure reaches the predetermined value, the supply pump 4 stops (or slows); thereby the pressure in the housing 8 is kept constant. As shown in FIG. 6, the structure of the extrusion valve 7 is the same as that of the first embodiment shown in FIGS. 2, 3, and 4. Based on the signals sensed by the position sensor 18, the rod 16 of the air cylinder 15 controls the rotor's reciprocal rotation through the arm 17.

In FIG. 6 topping material 20b is extruded over the dough body 19 that is being conveyed.

The conveying conditions of the dough body of bread dough or the like conveyed by the conveyor 1 at equal or unequal intervals are sensed by the position sensor 18. Sensor 18 obtains a location information signal for each dough body 19 indicating that is being irregularly conveyed. Based on the information signal, a timer (not shown) determines the required opening and closing times of the extrusion valve 7. Thus, the dough bodies 19 can each synchronously receive extruded topping material 20b regardless of whether or not the dough bodies 19 are conveyed at equal intervals.

The topping material 3a in the hopper 2 is supplied to the housing inlet 10 of the extrusion valve 7 and filled up to the long extrusion aperture of the rotor through the rotor inlet 11a and the long groove 11b of the rotor.

To precisely sense the pressure, the pressure sensor 6 is mounted e.g. on the housing inlet 10a of the housing 8 of the extrusion valve 7, or on the lower end of the supply pipe 5 near the housing inlet 10.

Due to either of the first or second reasons mentioned before, when the pressure in e.g. the housing becomes lower than the predetermined value, the pressure decrease sensed by the pressure sensor 6 is transmitted by a control feedback loop (not shown) to the supply pump 4. When this signal is transmitted to pump 4, it begins to operate to supply the topping material 3a to the supply pipe 5. Thus, the pressure returns to its predetermined value and the supply pump 4 stops (or slows), thereby keeping the pressure in e.g. the housing 8 almost always the same.

By adjusting the reciprocating motion of the rod's stroke, the extent of the rotation of the rotor 9 can be changed. Namely, by adjusting the overlapping relation of the rotor's long extrusion aperture 12 and the housing's long extrusion aperture 13, both apertures having the same lateral dimensions, the space in the direction of the thickness of the topping material 3a can be adjusted. Thus, the thickness of the topping material 3a, when it is extruded from the long extrusion aperture 13 of the extrusion valve 7, can be adjusted. Thereby the topping material 3a of an appropriate thickness is supplied over the upper surface of the dough body 19.

When the material is so extruded, the position sensor 18 (positioned above the conveyor 1 to sense the dough body) provides conveying control signals. By means of the timer (not shown) that calculates the timing of the opening and closing of the extrusion valve 7, synchronized extrusion operations are performed, so that the topping material 20b to be extruded is securely deposited on the upper surface of the dough body 19.

Thus in accordance with the invention, a pressure sensing means is provided in e.g. the housing. The pressure sensing means measures and senses the pressure of the dough of the food material in e.g. the extrusion valve. When the pressure sensing means senses a fall in pressure, it operates the supply pump. The pressure fall occurs when the material is extruded from the extrusion valve, or when an intermittent extrusion is carried out due to the high viscoelasticity that is the characteristic of the food material making it flow back into the hopper through the supply pump.

In accordance with the present invention, such a pressure decreases is adjusted for, to maintain the pressure at its predetermined value. Therefore, the food material is stably extruded from the extrusion valve.

Also in accordance with the invention, a pressure sensing means is provided in e.g. the value housing to sense the pressure in the housing. Based on a sensed pressure decrease, the pressure sensing means operates the supply pump. As the pump is operated, this adjusts for the pressure decrease due to the topping material being extruded from the extrusion valve, the supply pump being stopped, due to the back flow of the highly viscoelastic topping material into the hopper through the supply pipe. Thus, by keeping the extrusion pressure constant, the topping material is stably extruded.

By locating the position sensing means upstream of the extrusion valve relative to the conveyor, it is possible to stably deposit the topping material on the upper surface of the dough body.

We claim:

1. An apparatus for intermittently extruding a predetermined quantity of food material comprising:

a hopper with a supply pump near its exit;

a supply pipe having one end connected to the supply pump and the other end to an intermittently operable extrusion valve; and a pressure sensor in communication with an interior of the supply pipe.

2. The apparatus of claim 1, further comprising means for operating the supply pump in response to a pressure sensed by the pressure sensor.

3. The apparatus of claim 1, wherein the extrusion valve is in a housing, and wherein the pressure sensor is mounted on one of the housing and the supply pipe.

4. A method of intermittently extruding a predetermined quantity of a viscous food material, comprising the steps of:

pumping the food material into an intermittently operating extrusion valve; then, not pumping the food material;

sensing a pressure of the pumped food material upstream in the extrusion valve; and resuming the pumping if the pressure falls below a predetermined value.

5. An apparatus for intermittently extruding a predetermined quantity of food material comprising:

a hopper;

a conveyor adjacent the hopper;

a position sensor located above the conveyor;

a supply pump provided near an exit of the hopper at a position above the conveyor and downstream, relative to motion of the conveyor, of the position sensor, a supply pipe having one end connected to the supply pump and the other end to an intermittently operable extrusion valve; and a pressure sensor in communication with an interior of the supply pipe.

6. The apparatus of claim 5, further comprising means for operating the supply pump in response to a pressure sensed by the pressure sensor.

7. The apparatus of claim 5, wherein the extrusion valve is in a housing, and wherein the pressure sensor is mounted on one of the housing and the supply pipe.

8. The apparatus of claim 5, further comprising means for operating the extrusion valve to deposit the material extruded from the valve onto a particular location on the conveyor, in response to a position sensed by the position sensor.

9. A method for intermittently extruding a predetermined quantity of viscous food material, comprising the steps of:

pumping the food material into an extrusion valve;

operating the extrusion valve intermittently to extrude the food material therefrom;

sensing a pressure of the pumped material; and varying a speed of the pumping to maintain a constant sensed pressure.

10. The method of claim 9, wherein the material is extruded onto a conveyor, and further comprising the steps of:

sensing a location on the conveyor; and operating the extrusion valve to deposit the extruded material onto the sensed location.

* * * * *